Nov. 19, 1940. C. E. REED Re. 21,628

CROSS ROLLER EARTH BORING DRILL

Original Filed May 23, 1938 2 Sheets-Sheet 1

Inventor:

Clarence E. Reed,

By Spear, Donaldson & Hall

Attorneys.

Nov. 19, 1940. C. E. REED Re. 21,628

CROSS ROLLER EARTH BORING DRILL

Original Filed May 23, 1938 2 Sheets-Sheet 2

Inventor:

Clarence E. Reed,

By Spear, Omansan & Hale

Attorneys.

Reissued Nov. 19, 1940

Re. 21,628

UNITED STATES PATENT OFFICE 21,628

CROSS ROLLER EARTH BORING DRILL

Clarence E. Reed, Wichita, Kans., assignor to Chicago Pneumatic Tool Company, New York, N. Y., a corporation of New Jersey Original No. 2,177,334, dated October 24, 1939, Serial No. 209,563, May 23, 1938. Application for reissue May 16, 1940, Serial No. 335,637

10 Claims. (Cl. 255—71)

The invention concerns an earth boring drill and is disclosed in connection with the general type known as a cross roller bit in which a plurality of roller cutters are arranged in the same diametrical plane and cut the major portion of the formation, and inclined side cutters arranged in a diametrical plane substantially at right angles to the plane in which the first mentioned cutters are located, cut the area at the margin of the bottom of the hole being bored.

One object of the invention is to provide a cutter assembly which will stand up to its work by taking care of end thrust of the cutters, thereby eliminating or reducing to a minimum the wear due ordinarily to said end thrust, and preventing the formation of tapered holes which require reboring at great expense.

Other objects will be clear from the following disclosure.

It will be understood that while the invention is illustrated in connection with an earth boring drill of the cross roller type, it is not limited as to all of its aspects thereto.

In these drawings, 1 indicates the main body of a bit head of substantially ordinary form having a threaded shank 2 for attachment to a drill stem. As in usual practice, the bit head is hollow to receive flushing fluid which is directed through openings 3 and 4 to the toothed roller cutters to keep them free from accumulations of the cut formations, and to cause the discharge of said material from the bore hole.

Figure 2:
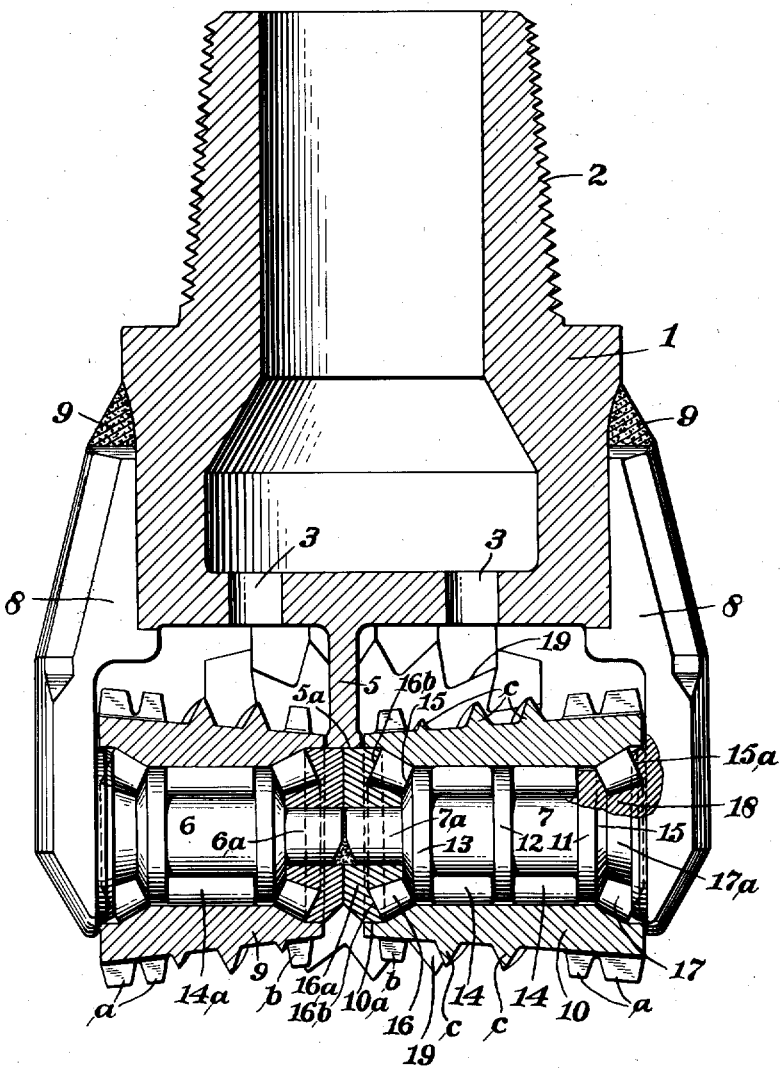
Fig. 2 is a central vertical sectional view of a bit head in a plane a quarter turn from the plane of section of Figure 1, and showing a pair of roller cutters arranged substantially end to end in axial alignment, and constituting the cross roller assembly per se.

A strut 5 depends from the lower face of the bit head being formed desirably intergral therewith. Main spindle units as shown in Fig. 2 marked 6, 7 are arranged below the lower face of the bit head, each having a shank or hanger portion 8 seated in a recess in the side of the bit head wherein it is welded, as shown at 9, said spindle member and shank preferably being formed in one piece. The spindle members 6 and 7 have each a reduced diameter part 6*a*, 7*a* substantially meeting at their end faces, the separation between them being slight but adapted to receive welding material by which the two spindle units may be connected. The two cutter units of Fig. 2 provide what are usually called the cross roller cutter, made up of substantially cylindrically shaped cutters 9 and 10 toothed on their exterior to perform cutting actions on the formation. This toothed formation may assume various forms, but in the particular assembly illustrated, each may consist of two circular rows of teeth *a* at the outer end portion of the cutter, a single row of teeth *b* at the inner end of the cutter, and a spiral rib *c* having a number of turns about the cutter and occupying the space between the circular rows of teeth *a*, *b*, the purpose of this toothed arrangement being to provide efficient means for breaking up or disintegrating the formation as rapidly as possible.

The spindle assemblies for the cross roller cutters 9 and 10 include similar features, and it will be sufficient to describe one of said assemblies. Referring, therefore, to the righthand assembly in Fig. 2, it comprises the main spindle portion 7 of comparatively large diameter and its extension 7*a* of reduced diameter, and annular flanges 11, 12, and 13. The flanges 11 and 13 present on one side, surfaces lying in planes at right angles to the axis of the spindle, and thus furnish the end walls of raceways for cylindrical roller bearings 14, which find complementary surfaces upon which to roll on the bore wall of the roller cutter 10 and on the cylindrical periphery of the spindle 7. The flanges 11 also present frusto-conical surfaces 15 which form walls of frusto-conical raceways, the complementary frusto-conical raceway surfaces of which are on the bore wall of the cutter and on spindle portions adjacent the ends of the roller cutter.

These frusto-conical raceways receive frusto-conical roller bearings 16 and 17. The larger diameter ends of those marked 17 are directed outwardly from the vertical axis of the drill, and hence take end thrust of the roller cutter in a direction radially outward from the center of rotation of the drill. Those frusto-conical roller bearings marked 16 take end thrust of the roller cutter 10 in a direction inwardly towards the vertical axis of the drill.

Both sets of frusto-conical roller bearings take thrusts of the roller cutter radial to the axis individual to said cutter, and also some of the upthrust from the bottom of the hole. The major portion of this upthrust or radial thrust of the cutter is borne however, by the two sets of cylinder roller bearings 14 in the cylindrical raceway divided by the annular flange 12.

The frusto-conical raceway for the frusto-conical bearing rollers 17 is formed in the base or enlargement 18 integrally connecting the side hanger or bracket 8 and the spindle portion 7, said enlargement or base member being undercut at 15a to furnish the outer wall of the raceway of which the surface 17a furnishes the frusto-conical bearing surface.

The frusto-conical raceway for the frusto-conical roller bearings 16 is provided by the separate spindle member or collar 16a having a central opening to fit the reduced diameter portion 7a of the spindle member 7, an undercut surface 16b serving as the defining wall of the frusto-conical raceway at the large diameter end of the frusto-conical roller bearing.

The spindle section 16a has a cylindrical exterior which fits in part into the cylindrical counterbore 10a at the inner end of the roller cutter. This collar or spindle section also fits in part in a recess in the strut or bridge piece 5. This recess may be in the form of a downwardly open notch 5a in the lower edge portion of said bridge.

The spindle section or collar 16b fits against a similar spindle section or collar belonging to the spindle assembly of the left hand cross roller cutter 9 of Fig. 2. These collars may be welded together.

The spindle and roller bearing assembly for the cross roller cutter 9, Fig. 2, is substantially the same as above described, the main difference being that the cutter 9 is shorter than the roller cutter 10, and hence one set of cylindrical roller bearings 14a is used instead of two spaced apart rows, as in the case of roller cutter 10.

Figure 1:
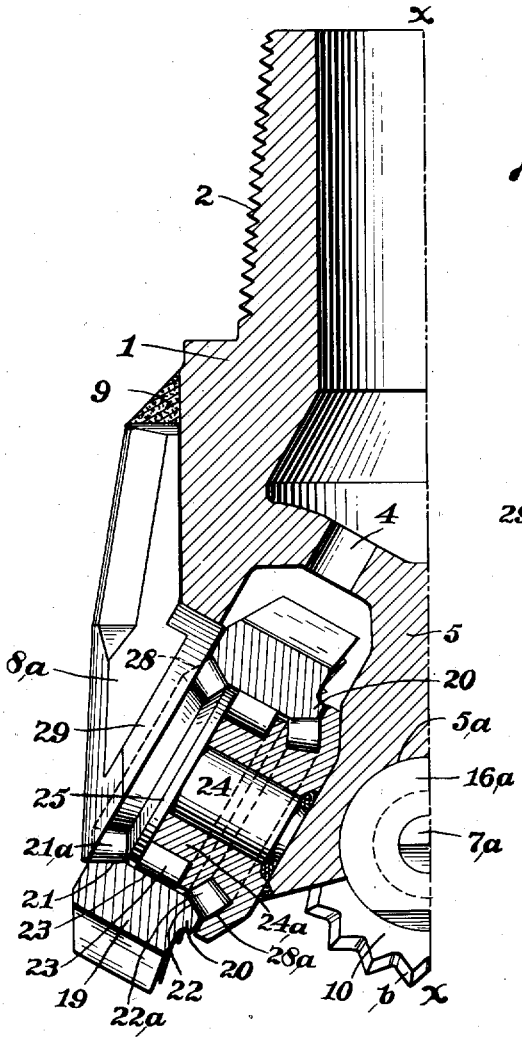
Figure 1 is a central vertical sectional view of one half of a drill bit head, showing one of the side roller cutters and its spindle and roller bearing assembly.
Figure 3:
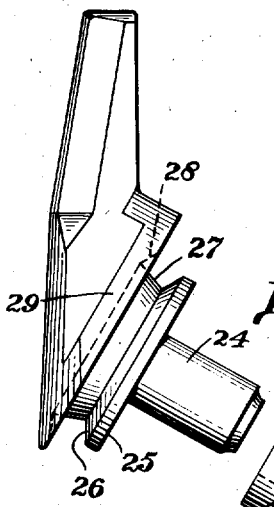
Fig. 3 is a side view of one of the spindle members of the assembly shown in Figure 1.

Referring to Figure 1, which shows one of the side roller cutter assemblies of which, as in ordinary practice, there are two located in a vertical plane 90° from the plane of Fig. 2, it will be noted that the side roller cutter 19 is mounted to rotate in a plane inclining downwardly and outwardly in relation to the vertical axis of the drill indicated at $x$—$x$. This roller cutter is generally of cylindrical form having peripheral teeth for distintegrating the formation.

These side roller cutters determine the diameter of the bore hole, it being noted that they cut clearance beyond the outermost surface of the bit head, or the brackets 8 or 8a thereof. It is important that end thrust of these cutters be taken care of to the fullest extent. In carrying out this object, as well as to secure long service of these side cutters, the body of the cutter is made wider than the toothed surface, for which purpose an extension or hub portion is provided at 20. By this addition, a longer bore is provided within the cutter than in ordinary practice, and I am thereby enabled to employ a frusto-conical raceway surface at each end of the bore of the cutter, in addition to a cylindrical raceway surface, said surfaces being marked 21, 22, and 23, Fig. 1. Roller bearings are provided at 21a, 22a, and 23a conforming to these raceway surfaces, those marked 21a and 22a being frusto-conical with their larger diameter ends directed in opposite directions, so that end thrust of the cutter in either inward or outward direction relative to the vertical axis of the drill will be taken by either one or the other of said frusto-conical roller bearings. Radial thrusts of the roller cutter and upthrusts from the bottom of the bore hole will be taken mainly by the cylindrical roller bearings 23a, and as the frusto-conical roller bearings thereby will be relieved of the major portion of these upthrusts and radial thrusts of the cutter, the said frusto-conical roller bearings will have a longer life than if they took all thrusts imposed upon the cutter, including the end thrusts. With my present improvement, the side roller cutters will maintain their position relative to the prescribed diameter of the bore hole by reason of the frusto-conical roller bearings standing up to their work for a larger period of time owing to being relieved in large measure by the cylindrical roller bearings from radial and upthrusts. By maintaining their prescribed positions, said side roller cutters will prevent the formation of a tapered bore hole, and the great expense of reboring to eliminate the taper.

The roller bearings of these side cutters run in raceways of a spindle assembly consisting of a main cylindrical spindle section 24, a flange 25 defining on one side the wall of a cylindrical raceway for the cylindrical roller bearings 23a, and presenting on its other side the inclined shoulder 26, defining the inner limit of the frusto-conical raceway 27, the other side of which is furnished by undercutting the shoulder or base 29, as at 28, of the hanger or bracket 8a, which, as in ordinary practice, is welded or secured to the outer side of the bit head 1.

Figure 4:
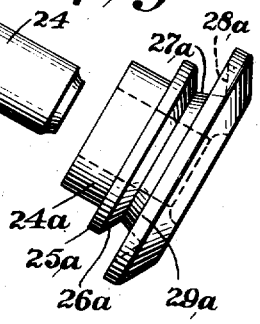
Fig. 4 is a side view of the other spindle member belonging to the side roller cutter organization of Figure 1.

The spindle assembly is completed by a spindle member adapted to be slipped onto the main cylindrical part 24 of said spindle assembly. This collar member or removable spindle section is shown in side view in Fig. 4, and in section in Fig. 1, the latter figure showing it in its assembled relation to the main spindle portion. It has a cylindrical body part 24a, a flange 25a with an inclined side 26a, defining the inner limit of a frusto-conical raceway surface 27a, also a flange 29a undercut to provide an inclined shoulder or bearing wall 28a. This formation provides the cylindrical raceway for the roller bearings 23a and the frusto-conical roller bearings 22a.

It will be noted that in devising the roller bearing assembly associated with the side roller cutter, I not only form the body of said roller cutter with a hub extension 20 on one side, but I take advantage of the full length of the bore wall of the cutter. In other words, the outer edge of the frusto-conical raceway surface of the bore wall coincides with the edge of the bore. This enables me to space the sets of frusto-conical cutters apart a sufficient distance to accommodate the cylindrical roller bearings and the raceway structure of the spindle for all of the sets of roller bearings.

In both assemblies of roller bearings, i. e., of Fig. 2 as well as in Fig. 1, the employment of the cylindrical roller bearings in association with the two sets of frusto-conical roller bearings which take the end thrusts, largely relieves these sets of frusto-conical rollers of wear, thereby enabling the latter to maintain the roller cutters in their prescribed relation to the center of the bore hole, with the result, in respect to the side roller cutters, that the prescribed diameter of hole will be maintained instead of producing a tapered hole, and in respect to the cross roller cutters, the result will be that said cutters will traverse their prescribed paths during the effective life of the cutter teeth, and wobbling of the drill bit as a whole will be prevented.

I claim:

1. A roller cutter for an earth boring drill having a toothed exterior and a bore substantially longer than the width of the cutting surface, said bore having roller bearing raceway surfaces, one at each end portion of said bore tapered inwardly of the cutter and providing bearing surfaces for frusto-conical roller end thrust bearings, said tapered end portions terminating substantially in the planes bounding the ends of said cutter bore.

2. A cross roller cutter assembly comprising a bit head having a centrally disposed depending strut provided with an opening, a main spindle member on each side of the strut, removable spindle members substantially abutting each other in the opening of the strut, each of said removable members having a portion contacting the strut, and a tapered raceway facing outwardly, and each having a recess disposed substantially centrally thereof, said main spindle portions having projections on which the removable spindle portions are mounted by said recesses, said main spindle portion having a flange adjacent the tapered raceway to provide a wall therefor, tapered end thrust roller bearings in said raceway, a cutter on the spindle mounted on said roller bearings, and a support at the outer end of each main spindle member, substantially as described.

3. An earth boring drill of the cross-roller type comprising a spindle, means engaging the ends of the spindle for supporting it on an approximately horizontal axis, a toothed roller cutter surrounding and rotatably mounted on the spindle, two spaced sets of frusto-conical roller bearings, one set adjacent each end of the spindle and between the cutter and spindle, said sets of roller bearings tapering in opposite directions whereby to sustain horizontal thrusts on the cutter in opposite directions and a part of the vertical thrusts, a set of cylindrical roller bearings positioned between said frusto-conical bearings, whereby to sustain vertical thrusts on the cutter in a direction perpendicular to the axes of the cylindrical roller bearings, and complementary raceways in the cutter and spindle respectively for said roller bearings.

4. A roller cutter and spindle assembly for an earth boring drill, said cutter having a toothed exterior and a bore longer than the width of said toothed exterior, a set of frusto-conical end thrust roller bearings at each end of the bore, a frusto-conical raceway surface at each end of said bore, for said end thrust bearings, a spindle support and a spindle having raceway surfaces, one for each of said sets of frusto-conical roller bearings, said spindle raceway surfaces lying partly outside the planes bounding the ends of said cutter bore, said bore and said spindle having each a bearing surface of substantial width intermediate the said frusto-conical raceway surfaces.

5. A roller cutter and spindle assembly for an earth boring drill according to claim 4 in which the spindle comprises a main section and a removable section connected therewith, the said main section having a shoulder undercut beyond the plane bounding the adjacent end of the cutter bore and defining the outer limit of the frusto-conical raceway surface of the said main spindle section, and the removable spindle section having a similar undercut defining the outer limit of the frusto-conical raceway in said removable section, the main and removable spindle sections having each an annular flange defining the inner limit of its frusto-conical raceway, one of said spindle sections having a cylindrical raceway and anti-friction roller bearings of cylindrical form between said cylindrical raceway and the said intermediate bearing surface of the wall of the cutter bore, the flanges of said spindle section providing walls defining the limits of the cylindrical raceway and between which walls the cylindrical anti-friction roller bearings are guided, substantially as described.

6. A side roller cutter assembly for an earth boring drill comprising a roller cutter having a toothed exterior and a bore substantially longer than the width of the cutting surface, said bore having roller bearing raceway surfaces, one at each end portion of said bore, and providing bearing surfaces for roller bearings, said end portions terminating substantially in the planes bounding the ends of said cutter bore, roller bearings, and a spindle having raceways for said roller bearings, said roller bearing raceways on said spindle extending at each side of the cutter substantially outside the planes bounding the width of the toothed exterior.

7. A side roller cutter and spindle assembly for an earth boring drill, said cutter having a toothed exterior and a bore longer than the width of said toothed exterior, end thrust bearings and two sets of roller bearings, a raceway surface at each end of said bore, a spindle support and a spindle having raceway surfaces, one for each of said sets of rollers bearings, said cutter bore and said spindle having each a bearing surface of substantial width intermediate the said raceway surfaces, said bearing raceways on the spindle extending at each side of the cutter substantially outside the planes bounding the width of the toothed exterior.

8. In a drill bit, an annular cutter having a bore substantially longer than the width of its cutting surface, a cutter support including a spindle, the axis of the spindle inclining downwardly and inwardly of the drill, a shoulder at each end of said spindle serving to take end thrusts of the cutter, a raceway within and at each end of the cutter, each extending to the adjacent end of the bore, a set of roller bearings contacting each of the raceways to the outer ends of the bore, and a set of rolling bearings between said sets of roller bearings, said spindle including raceways for said roller and rolling bearings.

9. A drill bit according to claim 8 in which said cutter has a hub formation on its side facing toward the drill axis.

10. In a drill bit, a side roller cutter of annular formation, a downwardly and inwardly directed spindle for said cutter, a shoulder at each of the opposite ends of said spindle, positioned outside of the plane of the ends of the cutting surface of said cutter for confining the cutter and roller bearings, said cutter having a bore, a rolling bearing raceway surface intermediate its ends, roller bearings interposed between said cutter and spindle on the opposite sides of said rolling bearing raceway, said spindle having a grooved corresponding raceway adapted to register with the rolling bearing raceway, and rolling bearings in said grooved raceway.

CLARENCE E. REED.